US012762604B1

(12) United States Patent
Liu et al.

(10) Patent No.: US 12,762,604 B1
(45) Date of Patent: Oct. 13, 2026

(54) PRODUCT ATTRIBUTE EXTRACTION FROM PRODUCT INGREDIENTS

(71) Applicant: Amazon Technologies, Inc., Seattle, WA (US)

(72) Inventors: Siliang Liu, Vancouver (CA); Rahul Suresh, Vancouver (CA); Amin Banitalebi Dehkordi, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 18/898,391

(22) Filed: Sep. 26, 2024

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0627* (2013.01)

(58) Field of Classification Search
CPC ................................................ G06Q 30/06–08
See application file for complete search history.

(56) References Cited

U.S. PATENT DOCUMENTS 10,951,831 B2 * 3/2021 Seiffert .................. H04N 25/00
11,748,800 B1 * 9/2023 Yuan ...................... G16H 50/70 705/26.7
2023/0334552 A1 * 10/2023 Levin ..................... G16H 20/10
2024/0331008 A1 * 10/2024 Jalan ...................... G06Q 10/40
2025/0104127 A1 * 3/2025 Marasco ............ G06Q 30/0631

OTHER PUBLICATIONS

Hansani, Maduri et al., "Ontology based Machine Learning Approach for Facial Skincare Products Recommendation", 2024 Int'l Conf. on Image Processing and Robotics, 979-8-3503-7476-6/24 (Year: 2024).*

* cited by examiner

*Primary Examiner* — Ethan D Civan
(74) *Attorney, Agent, or Firm* — Knobbe, Martens, Olson & Bear, LLP

(57) ABSTRACT

Systems and methods are described for a product recommendation system for automatically extracting ingredient-related attributes for a product based on the product's ingredients in order to generate product recommendations for a user. The systems and methods may use a model to determine the attributes from the product ingredients. The primary input into the model may include a product ingredient list, and optionally a product title. The model may identify product attributes, such as target skin types and concerns, for a product based on the product's ingredients. The product recommendation system may then match these attributes with user preferences and then generate product recommendations tailored to match the user's preferences based on the matching.

20 Claims, 6 Drawing Sheets

PRODUCT ATTRIBUTE EXTRACTION FROM PRODUCT INGREDIENTS

BACKGROUND

A number of different computer-implemented approaches have been used or proposed for creating personalized beauty product recommendations for presentation to a user. For example, online retailers may suggest beauty products for a prospective user based on information about the user's skin or hair. Traditional methods for creating personalized beauty product recommendations often involve making product recommendations according to the user's skin or hair type and based on information provided by a third-party seller, such as a seller indicating that a particular product of the seller is intended for or compatible with a certain skin or hair type. For example, the third party seller may indicate in a product description that the product helps with dry skin and the user may indicate that they wish to buy a product that helps with dry skin. As such, traditional methods may recommend that product to the user.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
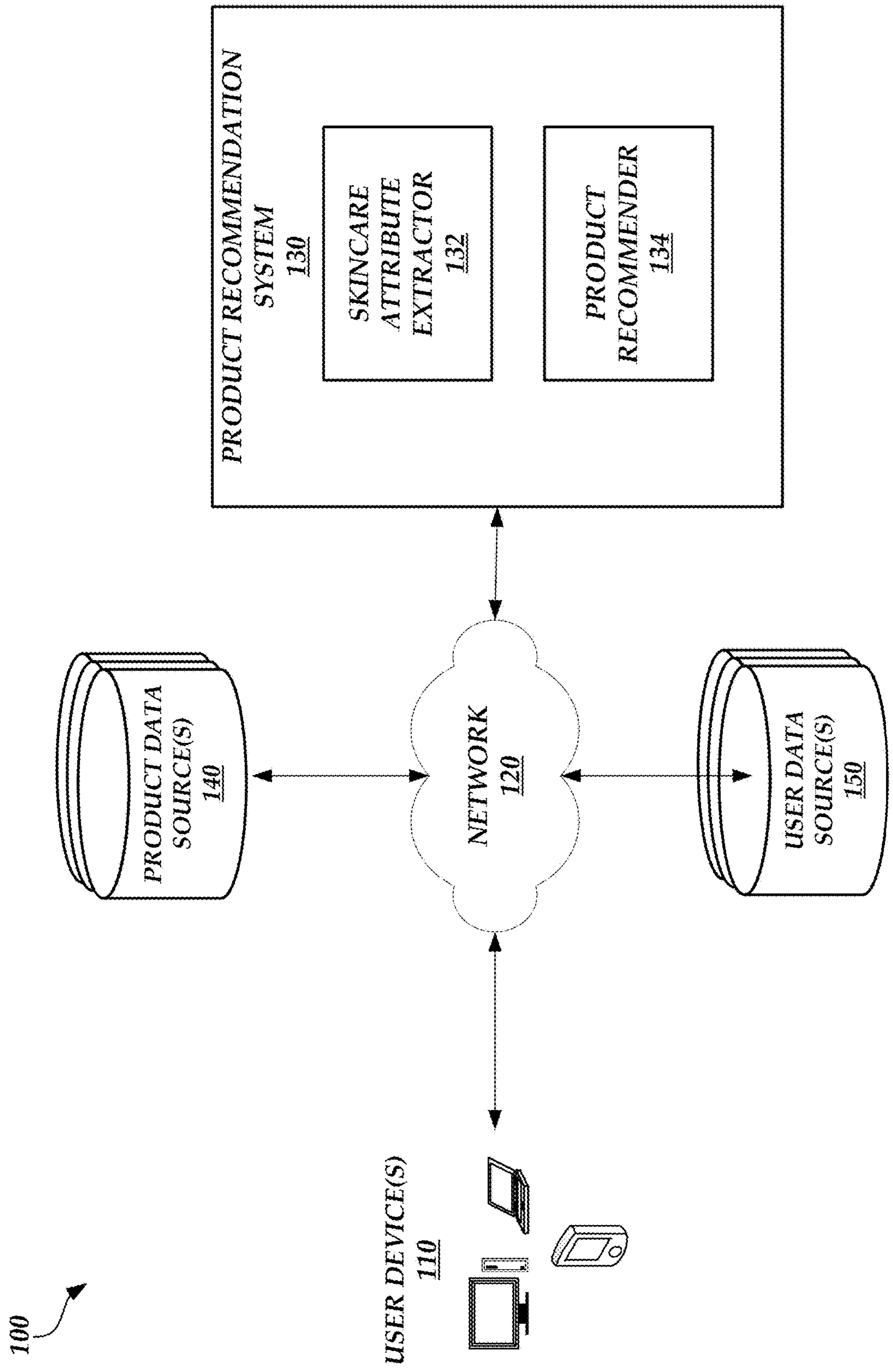
FIG. 1 is a block diagram depicting an illustrative environment in which components of a product recommendation system can determine skincare attributes for a product.

Generally described, aspects of the present disclosure relate to a product recommendation system for automatically extracting attributes for a product based on the product's ingredients in order to generate product recommendations for a user. The systems and methods may use an implicit modeling approach to determine the attributes from the product ingredients, which may include a pipeline to extract the product attributes. This pipeline may offer advantages in terms of accuracy, explainability, robustness, and flexibility compared to existing systems. Additionally, the implicit model can be fine-tuned to incorporate new attributes as they become available, enhancing its practicality in real-world applications. A text-based ingredient-derived attribute of interest from the user indicating the user's preferences may optionally be input to the product recommendation system in order to determine the product recommendations. Once the model has determined attributes associated with a product, the product recommendation system may match those attributes with a user's preferences in order to generate product recommendations for that user.

The primary input into the model may include a product ingredient list, and optionally a product title, which may be obtained from a product profile page (e.g., from an online catalog). The model may intermediately output various types of embeddings derived from the product ingredient list, such as sub-word embeddings, segment embeddings, and positional embeddings. These embeddings may help in understanding and processing the textual data for attribute extraction. As a final output, the model may produce multiple string values or product attributes. The model may be trained using a dataset that includes labeled pairs of product ingredients and a set of attributes associated with the product. In some embodiments, the model may use an energy-based implicit model architecture that can take the ingredient-derived attributes as part of the input and produce a score as output. This approach may help the system to effectively process and analyze skincare data to provide personalized and accurate product recommendations. References herein to ingredient-derived attributes may generally refer to product attributes that are capable of being determined from a list of the ingredients included in the product, optionally in view of other supplemental information about the product (but which are determined based at least in part on the products' ingredient list).

Personalized product recommendation is a strategy that can enhance the shopping experience by suggesting products that, depending on the embodiment, specifically match a user's skin or hair conditions, the user's current concerns, and/or benefits they can receive from specific products. Accurate beauty attribute extraction is preferred for personalized beauty recommendations and building trust with the users. Currently, existing systems and methods of beauty product recommendation systems may utilize product ingredient analysis to generate recommendations. These methods may include, among others, extracting ingredient efficacy based on user reviews and recommending products containing associated ingredients for users and recommending products based on ingredient similarity to products in specific skin type categories. However, these approaches do not perform direct ingredient analysis or leverage ingredient data itself to predict targeted skin concerns.

Other methods may introduce a deep learning skincare product recommendation system focusing on ingredient analysis and employing transformer encoder layers with a subsequent feed-forward block to predict ingredient efficacy across skin problems. However, such an approach and model architecture restricts its adaptability to new skincare attributes, which may limit its usefulness in the evolving beauty market, along with limiting its scope. In addition, most skin analyzers currently available are based on predefined knowledge bases and rely heavily on established datasets and structured information, but do not address the complexities of skincare attribute extraction.

Existing methods often may rely on third party provided information, where product benefits may be inconsistent among providers, incorrect or incomplete. Having such information accurately listed in the product catalog is particularly important for beauty category of products, as they are topically applied to skin and hair. A suboptimal beauty shopping experience may create a negative experience, which may manifest in users returning products, abandoning their shopping missions, and losing trust in the entity providing the recommendations. As such, accurate identification of target skin types, target skin concerns, and generally preferred attributes is preferred to match users with the right products and enhance their shopping satisfaction.

Additionally, implementing a uniform policy across large online retailers may be challenging. Manual annotation may be costly and prone to errors due to a lack of scientific expertise. Therefore, there is a need for an automated and accurate method to extract beauty attributes from product ingredients.

Embodiments of the present disclosure address the above-mentioned problems by providing a product recommendation system for accurately extracting product attributes from product ingredients, which are preferred for a personalized experience for the user. The product recommendation system may identify product attributes, such as target skin types and concerns, for a product based on the product's ingredients, and match these attributes with user queries (e.g., questionnaire answers, search query history, etc.). This system may then generate beauty product recommendations tailored to match the user's skin conditions based on the matching.

The product recommendation system described herein may offer a consistent and engaging personalized beauty recommendation experience for a user across a selection of products, without depending on inputs from business vendors. Additionally, it may eliminate concerns related to inconsistent definitions of beauty attributes that may arise due to the diverse set of brands and vendors involved.

Turning to the figures, FIG. 1 is a block diagram depicting an illustrative environment 100 in which a product recommendation system 130 can recommend products based on determined skincare attributes for a product. The product recommendation system 130 may include a skincare attribute extractor 132 and a product recommender 134. The skincare attribute extractor 132 can determine product attributes associated with a product based on product ingredients and optionally a product title. The product ingredients and product title may be received, via a network 120, from the product data source(s) 140. The product recommender 134 may match user preferences, received from the user data source(s) 150, for a product with the product attributes determined by the skincare attribute extractor 132 and generate product recommendations for a user accordingly.

The product data source(s) 140 may be one or more data sources that contain information relating to a product. For example, one product data source may be an online catalog of products or other items available for purchase, which may contain or be used to generate a product detail page including various information and/or attributes related to the product. The product attributes may be a number of attributes associated with the product, including a list of ingredients and other information (such as brand, country of origin, product size information, color, etc.). For example, the product may be a face serum with the title "Skin Repair Serum|Cruelty Free, Paraben Free, Alcohol Free" and a list of ingredients may include "Betaine, Sodium Polyacrylate, Hyaluronate, Panthenol." However, this is not meant to be limiting or required, as other sources of product information may also be possible. For example, the product information may come from a dataset including information about the products.

The user data source(s) 150 may be one or more data sources that contain user-specific attributes that represent information about a user's preferences for skincare products for a particular user. For example, the user attributes may include target skin types, target skin concerns, and free-from materials in the product ingredients for a particular user. Target skin types may include dry skin, oily skin, combination skin, sensitive skin, etc. Target skin concerns may include acne, pores, fine lines, wrinkles, sagging, dark spots, dullness, redness, uneven texture, dark circles, and the like. A "free-from materials" attribute or preference may indicate that a given product does not include (e.g., is free of or free from) particular product ingredients or other characteristic, with examples including Vegan, Cruelty Free, Fragrance Free, Hypoallergic, Paraben Free, Mineral Oil Free, Palm Oil Free, Oil Free, Alcohol Free, Sulphate Free, Gluten Free, Silicone Free, Phthalate Free, Talc free, Non-Comedogenic, Aluminum Free, Fluoride Free, and the like. The user data source(s) 150 may be a database(s), information stored in memory, or information received in real time (such as via a user interface), for example. The user data source(s) 150 may contain data originating from a skincare survey completed by the user or from previous search queries performed by the user. For example, the user may fill out an online survey answering questions related to their skin type, skin concerns, preferences for what they want in a skincare product, and the like. User attributes can also be identified by parsing previous search queries for the user, such as if the user previously searched for "hydrating lotion" then a user attribute may be "hydration." The user attributes may also or alternatively be identified by parsing current search queries for the user as the user is searching, or otherwise received dynamically from the user rather than retrieved from stored data. In other embodiments, user preferences may be inferred by the system based on past purchase or browsing history of the user. However, this is not meant to be limiting or required, as other data sources for the user attributes may also be possible.

Although FIG. 1 depicts an example in which the product recommendation system 130 receives the information via a network, in other examples, the product recommendation system 130 (or components thereof) may be co-located on the user device 110. A user device(s) 110 may be any computing device with which a user may interact with the product recommendation system 130. For example, the user device 110 may be a desktop, tablet, e-reader, server, wearable device, laptop or tablet computer, smartphone, gaming console, personal digital assistant (PDA), hybrid PDA/mobile phone, mobile phone, electronic book reader, set-top box, voice command device, camera, digital media player, or the like.

The network 120 can include any appropriate network, including wired network, wireless network, or combination thereof. For example, the network 120 may be a personal area network, local area network, wide area network, cable network, satellite network, cellular network, or any other such network or combination thereof. As a further example, the network 120 may be a publicly accessible network of linked networks, possibly operated by various distinct parties, such as the Internet. Protocols and components for communicating via the Internet or any other types of communication networks are known to those skilled in the art of computer communications, and thus, need not be described in more detail herein. In various embodiments, the network 120 may be a private or semi-private network, such as a corporate or university intranet. The network 120 may include one or more wireless networks, such as a Global System for Mobile Communications (GSM) network, a Code Division Multiple Access (CDMA) network, a Long-Term Evolution (LTE) network, C-band, mmWave, sub-6 GHZ, or any other type of wireless network. The network 120 can use protocols and components for communicating via the Internet or any of the other aforementioned types of networks. For example, the protocols used by the network 120 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art of computer communications, and thus, need not be described in more detail herein.

Figure 2:
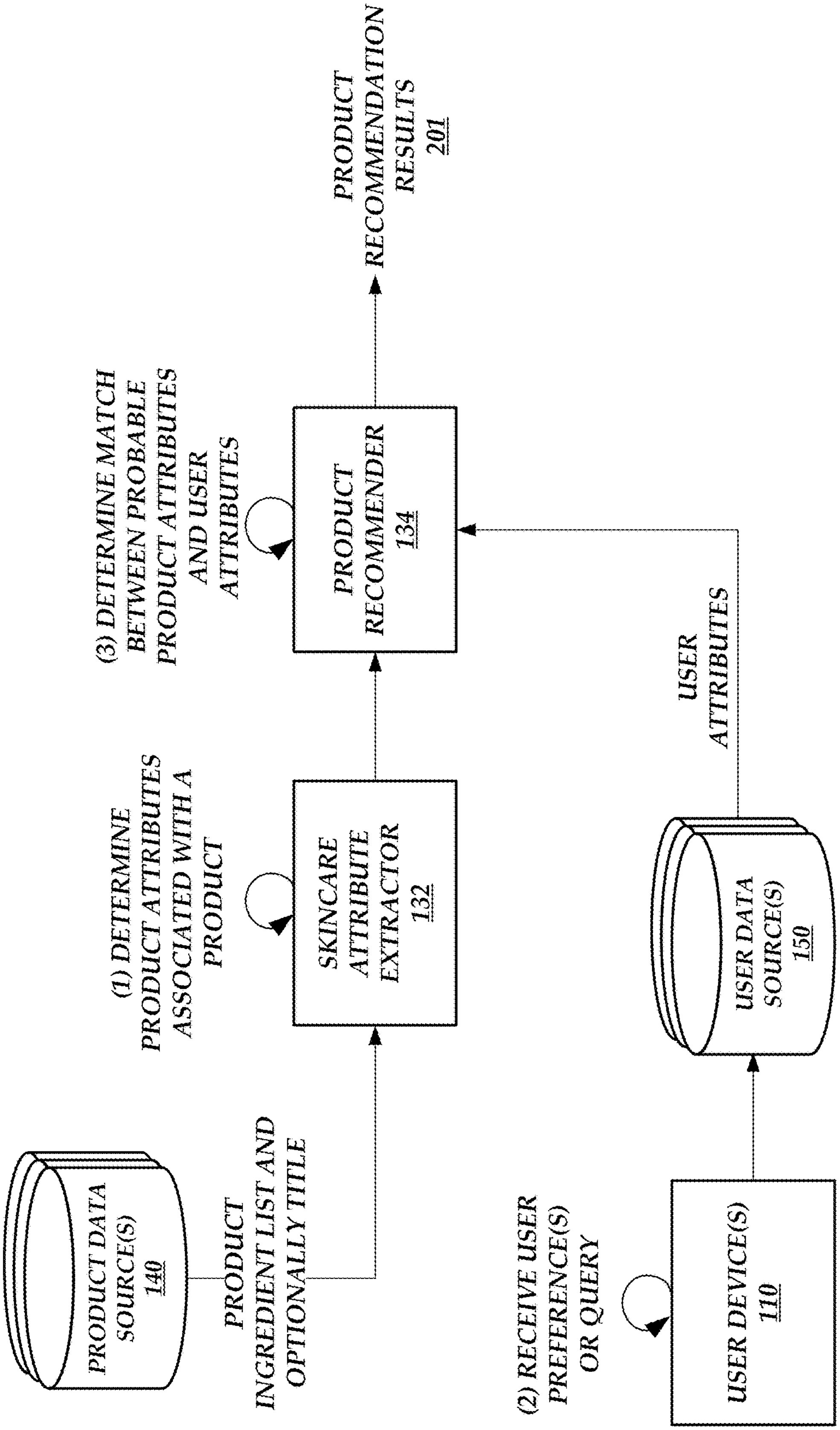
FIG. 2 depicts illustrative interactions between the components of the product recommendation system in order to predict whether the product attributes match a user's desired product attributes and generate product recommendations.

FIG. 2 depicts illustrative interactions between the components of the product recommendation system in order to determine product attributes associated with a product and generate product recommendations based on the determination. To begin, the skincare attribute extractor 132 may receive a product ingredient list and optionally a product title from the product data source(s) 140 for one or more products. For example, one product may be a face serum with the title "Skin Repair Serum|Cruelty Free, Paraben Free, Alcohol Free" and a list of ingredients including "Betaine, Sodium Polyacrylate, Hyaluronate, Panthenol."

At (1), the skincare attribute extractor 132 may determine the product attributes associated with a product. The skincare attribute extractor 132 may determine the product attribute using a model that can take as input the product ingredient list and optionally the product title and output probable product attributes associated with the product. The output probable product attributes may be product attributes that the model determines are most likely to be associated with this product. In some embodiments, the model may use an energy-based implicit model architecture that can take the ingredient-derived attributes as part of the input and produce a score as output. An example of the implicit model architecture will be further described in detail with respect to FIG. 3 and FIG. 4.

Continuing with the example of the face serum product, the model may receive as input the title "Skin Repair Serum|Cruelty Free, Paraben Free, Alcohol Free" and a list of ingredients including "Betaine, Sodium Polyacrylate, Hyaluronate, Panthenol." Then, the skincare attribute extractor 132 may determine, based on that list of ingredients and title, that the face serum likely has the following attributes: cruelty free, paraben free, alcohol free, dry skin, and acne.

Prior to the model determining the probable product attributes associated with the product, the model may have been trained. The model may be trained using a dataset that includes labeled pairs of product ingredients and a set of attributes associated with the product. For example, the dataset may contain the title for a face serum, the list of ingredients associated with the face serum, and one or more attributes associated with that product. In this way, the model may learn which product ingredients together may result in certain product attributes, as opposed to needing to rely on a one-to-one mapping between an ingredient and an associated product attribute.

At (2), the device(s) 110 may receive user preferences or a query from a user. The query may come in the form of a text-based query indicating a user's preferences for a product. The user preferences may indicate attributes the user may be seeking in a product for purchase. The user may input their product preferences in a variety of ways. For example, the user may input preferences for skincare products into the user device 110 via a survey or by entering a search query for a product in an online catalog. In the case of the search query, the system may be able to identify user preferences based on the type of product searched or the concerns (e.g., a search query for "products that help with dry skin") searched in the query. The user preferences may then be stored in the user data source(s) 150 as user attributes. The user attributes may be sent to the product recommender 134.

At (3), the product recommender may determine whether there is a match between the probable product attributes and the user attributes. For example, if the user attributes indicate the user is interested in products with attributes that are cruelty free and help with dry skin and the skincare attribute extractor 132 determined the product has those attributes (e.g., cruelty free, dry skin) that match the user attributes, then the product recommender 134 may determine there is a match. Based on the match(es), the product recommender 134 may generate product recommendation results 201. In the face serum example, the product recommendation results 201 may include the above described "Skin Repair Serum" because its probable attributes match the user attributes.

Figure 3:
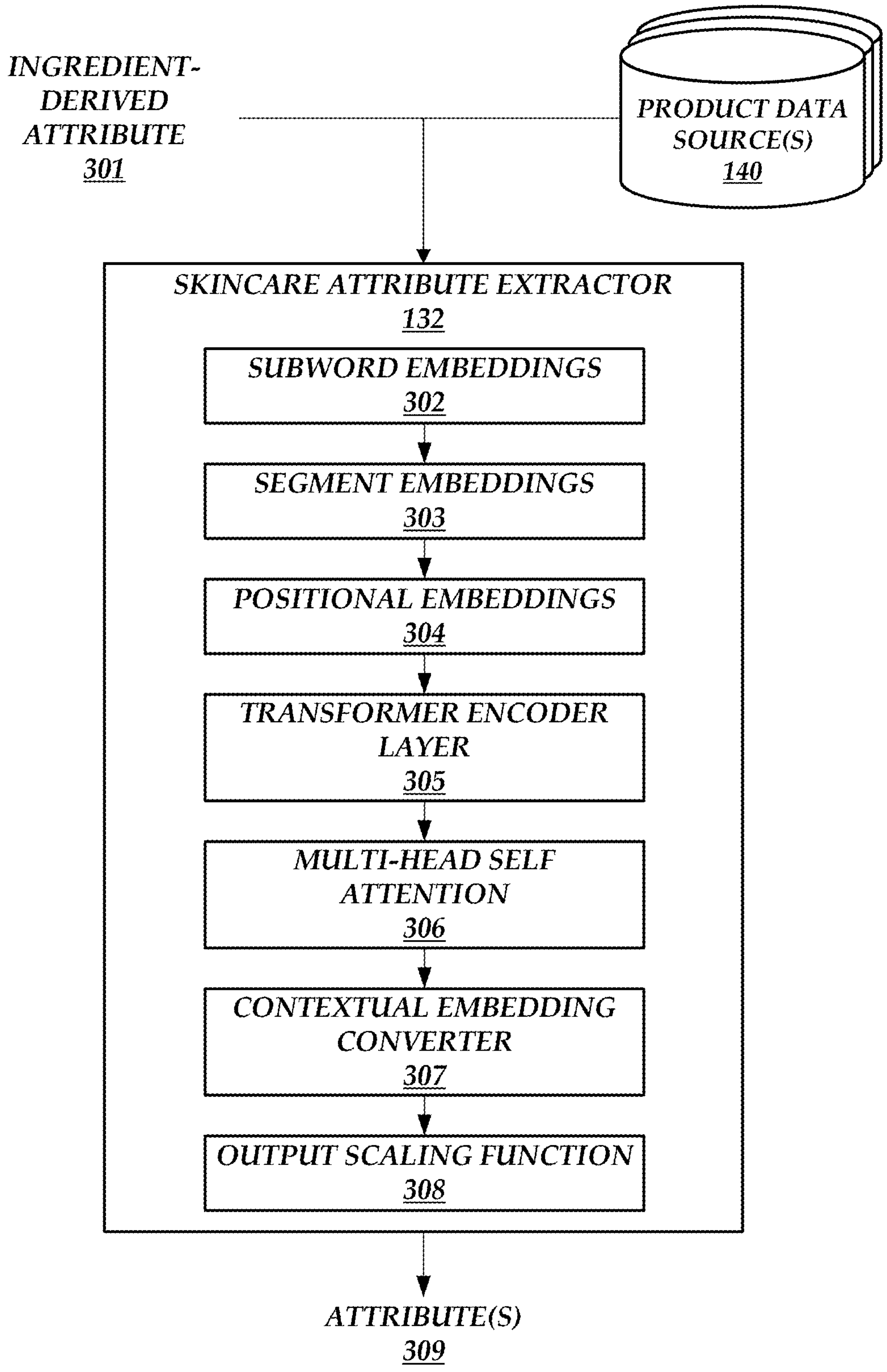
FIG. 3 provides a graphical representation of steps in a process of determining product attributes according to aspects of the present disclosure.

FIG. 3 provides a graphical representation of steps in an example process of determining product attributes according to aspects of the present disclosure. The skincare attribute extractor 132 may represent a model that can take as input text-based ingredient-derived attributes(s) 301 and a list of ingredients and optionally a product title from the product data source(s) 140 and produce the probability for the text-based ingredient-derived attributes(s) 301. Based on the product ingredients, the skincare attribute extractor 132 can infer whether each input text-based ingredient-derived attributes(s) 301 should be labeled as true or false for the product having the listed ingredients. In the example of the skin serum described above, since Betaine is an ingredient known for its hydrating properties, the skincare attribute extractor 132 may be likely to predict true for Dry Skin, meaning this product benefits those who have a dry skin type.

In some examples, the skincare attribute extractor 132 may include a bidirectional transformer encoder similar to a Bidirectional Encoder Representations from Transformers (BERT). The example skincare attribute extractor 132 may retain the structure of a BERT architecture in all layers except for the final layer. Specifically, while the initial N−1 layers may remain unchanged from a traditional BERT architecture, the final Multilayer Perceptron (MLP) may be removed from the last layer of the transformer encoder. Instead, the output probability may be directly formulated using the self-attention values.

The skincare attribute extractor 132 may not use the feed-forward layers in the last transformer encoder block and may not have any additional classifier modules commonly used in downstream learning tasks. Instead, the log its may be directly calculated from the attention values.

Conceptually, the model used by the skincare attribute extractor 132 can be viewed as an energy-based model (EBM), such as described in "A Tutorial on Energy-Based Learning," by LeCun et al., or "Energy-Based Models for Sparse Overcomplete Representations," by Teh et al. For example, the model can assign a normalized scalar (or "energy") to each input data point, thereby representing a probability distribution over the training data. The model may be characterized as an implicit method, accepting the attributes(s) 301 as input and generating predictions solely for that attribute. This differentiates it from traditional multi-label classifiers, which use explicit definition of the classifier module and the number of output classes.

Prior to input into the model, for each product, the attributes(s) 301 may be concatenated with ingredients and optionally title to pass to the model. The list of ingredients may maintain the original sequence order to assist in predicting the attributes, as the order reflects the standard convention of listing higher potency ingredients first. In some embodiments, the attributes(s) 301 may be tokenized and padded to a length of three, while the product ingredients and title may also be tokenized. The entire sequence may be truncated or padded to ensure a final length of 512. The attributes(s) 301 may be placed at the beginning of the input sequence, maintaining a consistent position across all input sequences. The model may produce intermediate output, including various types of embeddings derived from the product ingredient list, such as sub-word embeddings 302 and segment embeddings 303, as well as positional embeddings 304. These embeddings may help in understanding and processing the textual data for attribute extraction. The embeddings may then go through a transformer encoder layer 305. The multi-head self-attention module 306 can output contextual embeddings. A contextual embedding converter 307 can convert the contextual embeddings to probabilities that may indicate a likelihood an attribute is associated with a product. The probabilities may be in the range of zero to one, for example. These probabilities may then be mapped to a score within a meaningful range (e.g., from negative infinity to positive infinity) using an output scaling function 308. This transformation enables the model to generate the final output attribute(s) 309. The attribute(s) 309 may be multiple string values for the ingredient-derived attributes.

Figure 4:
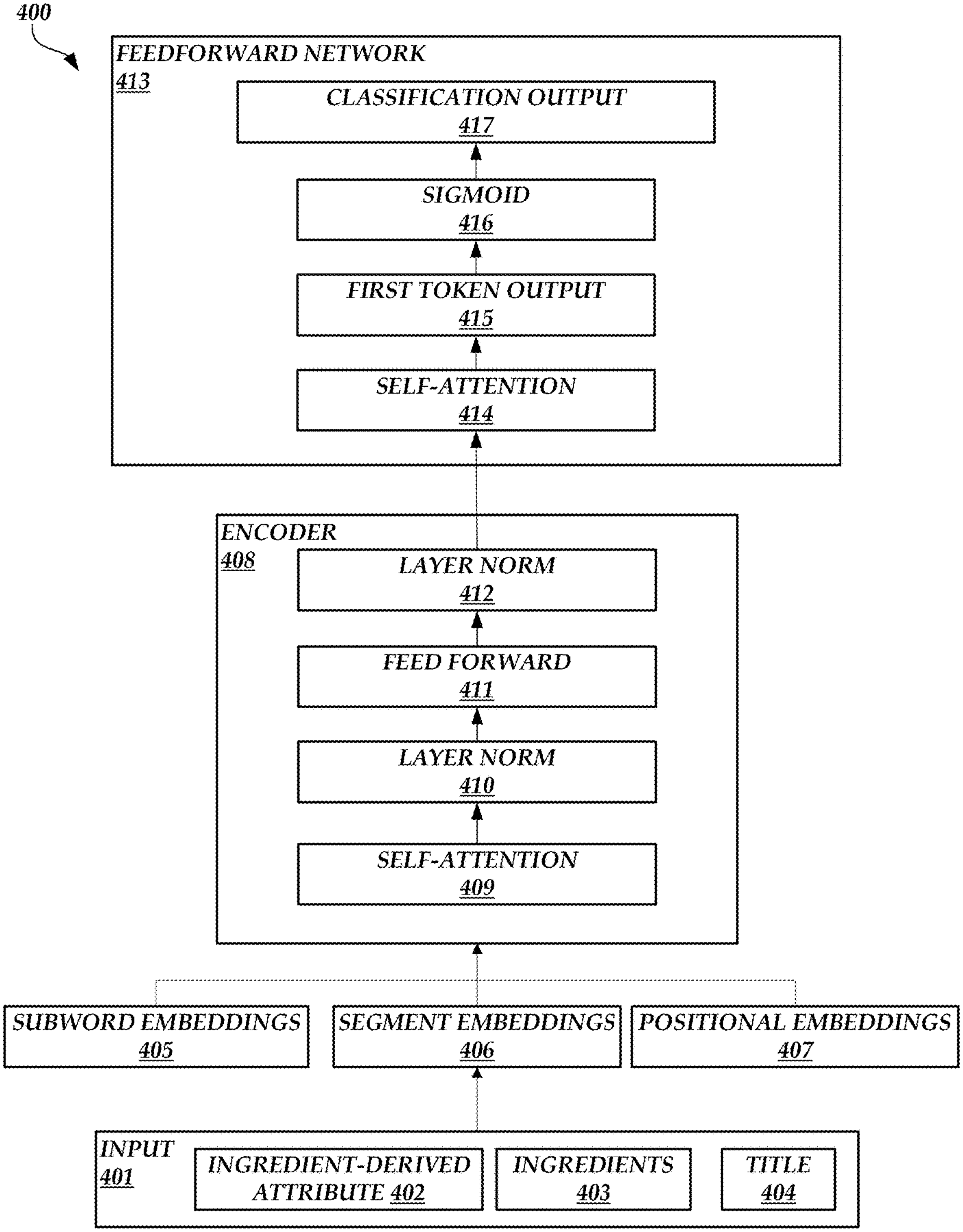
FIG. 4 provides a graphical representation of steps in a process of using an implicit model for determining product attributes according to aspects of the present disclosure.

FIG. 4 provides a graphical representation of steps in a process of using an implicit model 400 for determining product attributes according to aspects of the present disclosure. The implicit model 400 contrasts with explicit models, which may represent the standard way of fine-tuning the BERT model, where a classifier is attached to the end of the transformer. With the explicit model, the output dimension of the classifier is predetermined to correspond to the number of attributes. The present implicit model 400 may provide a method capable of incorporating new labeled attributes as they become available. Unlike conventional approaches that involve establishing a fixed list of class labels and training an explicit feed-forward network atop a pre-trained rich embedding, the disclosed implicit model 400 within the system may allow for dynamic fine-tuning with new attributes. The implicit model may accommodate real-world dynamic scenarios, where new trends and evolving consumer preferences drive the need to add new product attributes. For example, the emergence of clean beauty as a prominent trend is an example of evolving consumer preferences.

In the implicit model 400, the model takes input 401 of a ingredient-derived attribute 402 together with product ingredients 403 and a title 404. Note that the output log its may come directly from the self-attention values of the last encoder layer. As described above with respect to FIG. 3, the model 400 may produce intermediate output, including various types of embeddings derived from the product ingredient list, such as sub-word embeddings 405, segment embeddings 406, and positional embeddings 407. An encoder 408 may then receive the embeddings, which may be processed through the following layers: self-attention 409, layer norm 410, feed forward 411, and layer norm 412. These layers may represent the N−1 layers, as compared to N layers in a traditional explicit model. The model may then utilize a feedforward network 413 which includes a self-attention layer 414, a first token output 415, a sigmoid 416, and classification output 417.

Figure 5:
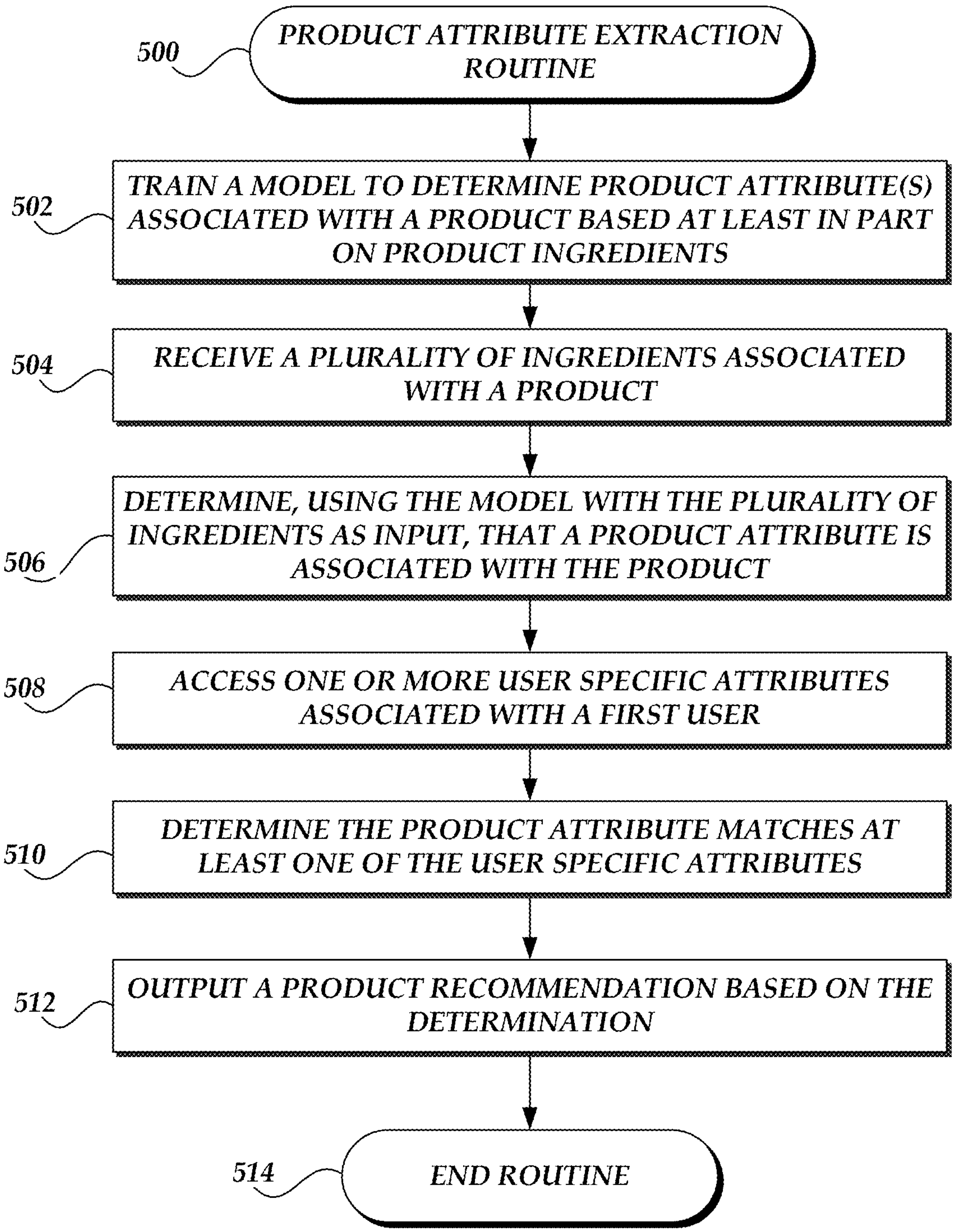
FIG. 5 is a flow chart depicting an example routine for determining a product attribute based on a list of ingredients for a product and producing product recommendations according to aspects of the present disclosure.

FIG. 5 is a flow chart depicting an example routine 500 for determining a product attribute associated with a product and outputting a product recommendation based on the determined product attribute. The routine 500 may begin automatically upon initiating a device (e.g., a product recommendation system 130), or may be initiated by a client or end-user on an ad hoc basis. The client or end-user may use an interactive system to initiate the routine 500. For example, a client or end-user may request the product recommendation when desired by the client or end-user using the interactive system. The routine 500 may also be initiated automatically based on a routine schedule (e.g., every hour, day, or week, etc.), in response to a triggering event, or both. For example, a routine schedule may set the routine 500 to automatically be performed every minute and therefore, the routine 500 may be performed every minute according to the set schedule. Additionally, a triggering event, for example, may be an added data event, etc., where an event occurrence in the network triggers initiation of the routine 500.

The routine 500 may be embodied in a set of executable program instructions stored on a computer-readable medium, such as one or more disk drives of a computing system of a node or a server. When the routine 500 is initiated, the executable program instructions can be loaded into memory, such as random access memory ("RAM"), and executed by one or more processors of a computing system, such as the product recommendation system 130 shown in FIG. 6.

The routine 500 begins at block 502, where the product recommendation system 130 may train a model to determine that a product attribute(s) is associated with a product based at least in part on the product ingredients. The model may take as input product ingredients and optionally a product title and output a product attribute that is likely associated with a product. The model may be trained using a dataset that includes labeled pairs of product ingredients and a set of attributes associated with the product. For example, the dataset may contain the title for a face serum, the list of ingredients associated with the face serum, and one or more attributes, such as "Cruelty Free" or "Dry Skin," associated with that product. In some embodiments, the training data may have been manually labeled, such as by a chemist, food scientist or other expert that reviews a list of ingredients for a product and assigns one or more labels of attributes to the product based on the ingredient list and optionally additional information (such as product title, brand, country of origin, and/or other information).

At block 504, subsequent to training of the model, the product recommendation system 130 may receive a plurality of ingredients associated with a particular product. The product may be a product that was not included in the training data. The product recommendation system 130 may additionally optionally receive the product title for the product. For example, the product recommendation system 130 may receive the title "Skin Repair Serum|Cruelty Free, Paraben Free, Alcohol Free" and a list of ingredients including "Betaine, Sodium Polyacrylate, Hyaluronate, Panthenol" that are associated with a face serum product. The product recommendation system 130 may receive or obtain the plurality of ingredients and optionally title from the product data source(s) 140 as described with respect to FIG. 2.

At block 506, subsequent to training the model, the product recommendation system 130 may determine, using the model with the plurality of ingredients as input, that a product attribute is associated with the product. For example, the product recommendation system 130 may determine the product attribute is associated with the product using the skincare attribute extractor 132. The skincare attribute extractor 132 may determine that the product attribute is likely associated with the product using a model that can take as input the product ingredient list and optionally the product title. The model may then output probable product attributes associated with the product. The output probable product attributes may be product attributes that the model determines are likely to be associated with this product. As an example and continuing with the example of the face serum, the skincare attribute extractor 132 may determine, based on the list of ingredients and title, that the face serum has the following attributes: cruelty free, paraben free, alcohol free, and dry skin.

In some embodiments, the product recommendation system 130 may use an implicit model architecture to determine the probable product attributes. The implicit model architecture is discussed in further detail with respect to FIG. 3 and FIG. 4. Using the implicit model architecture, the product recommendation system 130 may be configured to produce a likelihood score (e.g., a real-valued number ranging from 0 to 1) for each attribute associated with a product. In some examples, this score can be displayed on product pages or within recommendation widgets. Additionally, the system may be designed to output ingredients with high attention values for each predicted attribute. The product recommendation system 130 may also provide a set of adjustable configurations, including parameters such as processing sequence length and scaling factors for log its transformation for use in the implicit model architecture.

At block 508, the product recommendation system 130 may access one or more user-specific attributes associated with a first user. The user-specific attributes may indicate preferences the user may be seeking in a product for purchase. In some embodiments, the user may input a text-based query indicating the user's preferences. The user may indicate their product preferences in a variety of ways. For example, the user may input preferences for skincare products into the user device 110 via a survey or by entering a search query for a product in an online catalog. The user preferences may then be stored in the user data source(s) 150 as user attributes, which the product recommendation system 130 may access.

At block 510, the product recommendation system 130 may determine the product attribute matches at least one of the user-specific attributes. This may be performed by the product recommender 134 as described in FIG. 2. For example, if the user attributes indicate the user is interested in products with attributes that are cruelty free and help with dry skin and a product has those attributes (e.g., cruelty free, dry skin) that match the user attributes, then the product recommender 134 may determine there is a match. Based on the matches, the product recommender 134 may generate product recommendation results. In the face serum example, the product recommendation results may include the above described "Skin Repair Serum" because the product's probable attributes match the user attributes.

Therefore, at block 512, the product recommendation system 130 may output a product recommendation based on the determination. For example, the product recommendation system 130 may output the "Skin Repair Serum" as a recommended product for the user based on the match between the probable product attributes and the user-specific attributes.

Figure 6:
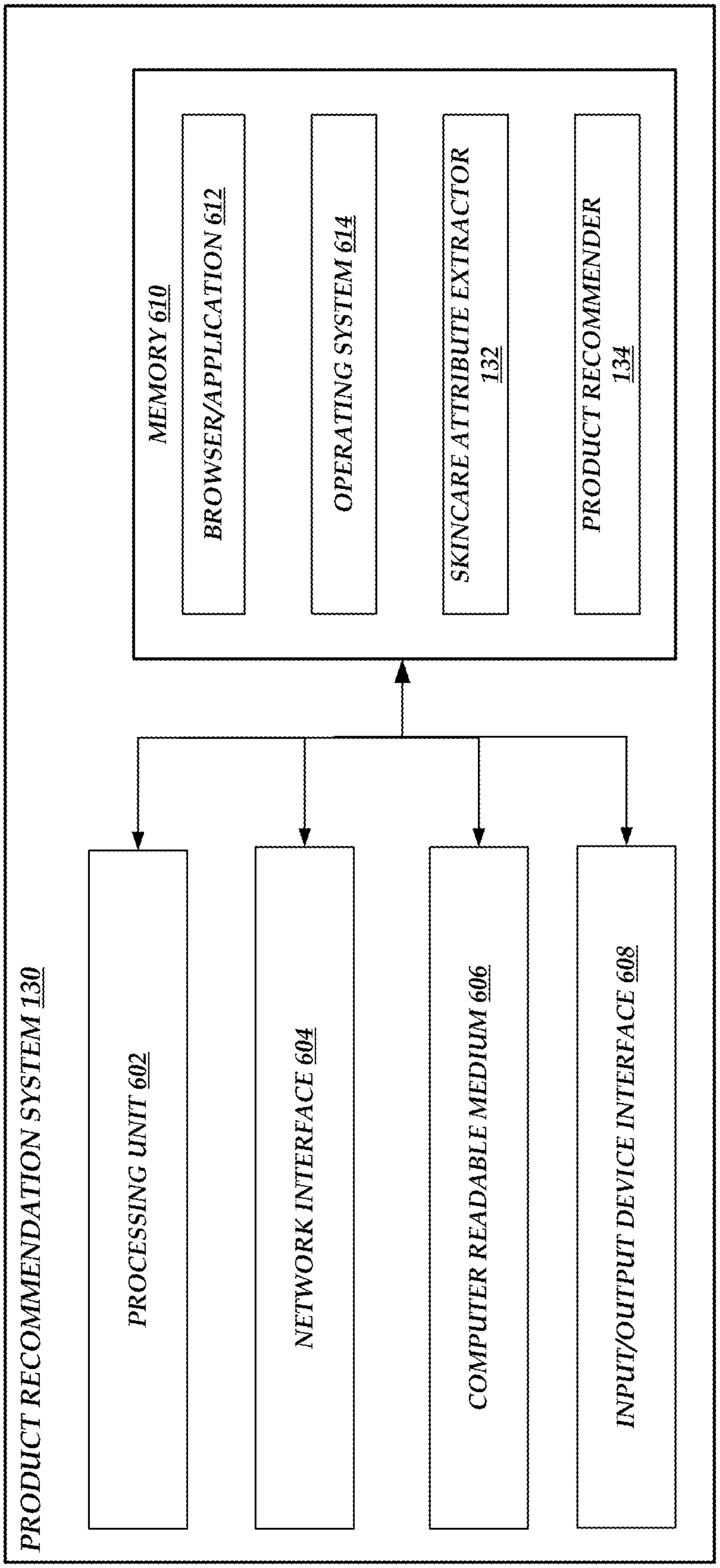
FIG. 6 shows an example computing device that may be used to implement aspects of the present disclosure.

FIG. 6 shows an example computing device that may be used to implement aspects of the present disclosure. The general architecture of the system depicted in FIG. 6 includes an arrangement of computer hardware and software that may be used to implement aspects of the present disclosure. The hardware may be implemented on physical electronic devices, as discussed in greater detail below. The system may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 1. As illustrated, the system includes a processing unit 602, a network interface 604, a computer readable medium drive 606, and an input/output device interface 608, all of which may communicate with one another by way of a communication bus.

The network interface 604 may provide connectivity to one or more networks or computing systems. The processing unit 602 may thus receive information and instructions from other computing systems or services via the network. The processing unit 602 may also communicate to and from memory 610 and further provide output information for an optional display (not shown) via the input/output device interface 608. The input/output device interface 608 may also accept input from an optional input device (not shown).

The memory 610 may contain computer program instructions (grouped as units in some embodiments) that the processing unit 602 executes in order to implement one or more aspects of the present disclosure, along with data used to facilitate or support such execution. While shown in FIG. 6 as a single set of memory 610, memory 610 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 610 may store an operating system 614 that provides computer program instructions for use by the processing unit 602 in the general administration and operation of the color blending system 106. The memory 610 may further include computer program instructions and other information for implementing aspects of the present disclosure. For example, in one embodiment, the memory 610 includes the browser or other application 612, the operating system 614, the skincare attribute extractor 132, and the product recommender 134. The skincare attribute extractor 132 and the product recommender 134 may represent code executable to determine product attributes for a product and recommend products based on the determination.

The system of FIG. 6 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 6 as a product recommendation system 130, similar components may be utilized in some embodiments to implement other devices shown in the environment of FIG. 1 and described elsewhere herein.

Some or all of the analysis methods described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application specific circuitry (e.g., ASICs or FPGAs) of the computer system. Where the computer system includes multiple computing devices, these devices may, but need not, be co located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:

a memory storing computer-executable instructions; and a processor in communication with the memory, wherein the computer-executable instructions, when executed by the processor, cause the processor to at least:

train, using a dataset comprising (a) product ingredients for each of a plurality of sample products and (b) a set of ingredient-derived attributes associated with each sample product of the plurality of sample products, a model to generate, from product ingredients of an input product, an embedding derived from the product ingredients of the input product and to predict, based at least in part on the embedding, which of a plurality of product attributes are associated with the input product;

for each individual product of a plurality of products, wherein the plurality of products are skincare products and are different than the plurality of sample products included in the dataset:

receive a list of ingredients associated with the individual product;

generate, using the model, an embedding derived from the list of ingredients associated with the individual product;

determine, using the model and based at least in part on the embedding derived from the list of ingredients associated with the individual product, at least one product attribute of the plurality of product attributes is associated with the individual product;

store the at least one product attribute associated with the individual product as one or more learned attributes associated with the individual product;

access a user profile associated with a user, wherein the user profile comprises one or more user attributes indicating target skincare preferences for the user;

determine that one or more learned attributes associated with at least one product of the plurality of products match at least one user attribute of the one or more user attributes; and generate personalized product recommendations for the user that include the at least one product matching the at least one user attribute.

2. The system of claim 1, wherein the one or more user attributes comprise one or more of: skin type, skin concern, or free-from material preference.

3. The system of claim 1, wherein the user profile is based on at least one of:

one or more past user search queries or one or more user completed skincare surveys.

4. The system of claim 1, wherein the model is an implicit model that takes the list of ingredients and an ingredient-derived attribute as input and produces a score as output.

5. A computer-implemented method comprising:

training a model to generate, from product ingredients of an input product, an embedding derived from the product ingredients of the input product and to predict, based at least in part on the embedding, which of a plurality of product attributes are associated with the input product;

subsequent to training the model, receiving a list of ingredients associated with a product;

generating, using the model, an embedding derived from the list of ingredients associated with the product;

determining, using the model and based at least in part on the embedding derived from the list of ingredients associated with the product, at least one product attribute is associated with the product;

obtaining one or more user-specific attributes associated with a user;

determining the at least one product attribute associated with the product matches at least one user-specific attribute of the one or more user-specific attributes; and generating, based on the determination, personalized product recommendations for the user that include the product.

6. The method of claim 5, wherein the one or more user-specific attributes comprise one or more of: skin type, skin concern, or free-from material preference.

7. The method of claim 5, wherein the one or more user-specific attributes are based on at least one of: a past user search query or a user completed skincare survey.

8. The method of claim 5, wherein the embedding derived from the list of ingredients associated with the product corresponds to at least one of a sub-word embedding, a segment embedding, or a positional embedding.

9. The method of claim 5, wherein the model is trained using a dataset comprising labeled pairs of product ingredients and a corresponding set of ingredient attributes.

10. The method of claim 5, wherein the model is an implicit model that takes the list of ingredients and an ingredient-derived attribute as input and produces a score as output, wherein the ingredient-derived attribute relates to one or more of: skin type, skin concern, or a free-from material preference.

11. The method of claim 10, wherein the score represents a confidence score associated with a likelihood the at least one product attribute is associated with the product.

12. The method of claim 5, wherein determining the at least one product attribute is associated with the product comprises mapping an output probability prediction indicating a likelihood that the at least one product attribute is associated with the product to a score using a scaling function.

13. The method of claim 5, wherein the model comprises a bidirectional transformer encoder.

14. A non-transitory machine-readable storage medium encoded with instructions executable by a processor of a computing device, wherein the instructions, when executed by the processor, cause the computing device to at least:

train a model to generate, from product ingredients of an input product, an embedding derived from the product ingredients of the input product and to predict, based at least in part on the embedding, which of a plurality of product attributes are associated with the input product;

subsequent to training the model, receive a list of ingredients associated with a product;

generate, using the model, an embedding derived from the list of ingredients associated with the product;

determine, using the model and based at least in part on the embedding derived from the list of ingredients associated with the product, at least one product attribute is associated with the product;

obtain one or more user-specific attributes associated with a first user;

determine the at least one product attribute for the product matches at least one user-specific attribute of the one or more user-specific attributes; and generate, based on the determination, personalized product recommendations for the user that include the product.

15. The non-transitory machine-readable storage medium of claim 14, wherein the one or more user-specific attributes comprise one or more of: skin type, skin concern, or free-from material preference.

16. The non-transitory machine-readable storage medium of claim 14, wherein the one or more user-specific attributes are based on at least one of: a past user search query or a user completed skincare survey.

17. The non-transitory machine-readable storage medium of claim 14, wherein the embedding derived from the list of ingredients associated with the product corresponds to at least one of a sub-word embedding, a segment embedding, or a positional embedding.

18. The non-transitory machine-readable storage medium of claim 14, wherein the model is trained using a dataset comprising labeled pairs of product ingredients and a corresponding set of ingredient attributes.

19. The non-transitory machine-readable storage medium of claim 14, wherein the model is an implicit model that takes the list of ingredients and a text based an ingredient-derived attribute as input and produces a score as output, wherein the ingredient-derived attribute relates to one or more of: skin type, skin concern, or a free-from material preference.

20. The non-transitory machine-readable storage medium of claim 14, wherein to determine the at least one product attribute is associated with the product further causes the computing device to map an output probability prediction indicating a likelihood that the at least one product attribute is associated with the product to a score using a scaling function.

* * * * *